United States Patent

Gionet et al.

[15] 3,643,755
[45] Feb. 22, 1972

[54] CLOSURE INSTALLATION

[72] Inventors: Edmond R. Gionet, Warren; Neil A. Hull, Birmingham, both of Mich.

[73] Assignee: General Motors Corporation, Detroit, Mich.

[22] Filed: July 10, 1970

[21] Appl. No.: 53,858

[52] U.S. Cl. ............................180/69 C, 16/128.1, 180/112, 296/76
[51] Int. Cl. .........................................B62d 25/12
[58] Field of Search..........................180/69 R, 69 C, 112, 82; 296/76, 146; 16/128.1

[56] References Cited

UNITED STATES PATENTS

| | | | |
|---|---|---|---|
| 2,188,891 | 1/1940 | Haltenberger | 180/69 C |
| 2,826,256 | 3/1958 | Haltenberger | 180/69 C |
| 2,991,117 | 7/1961 | Tatter | 16/128.1 UX |
| 3,115,946 | 12/1963 | Hacker | 180/69 C |
| 3,330,593 | 7/1967 | Pollak | 296/76 |
| 3,424,263 | 1/1969 | Black | 180/82 |

FOREIGN PATENTS OR APPLICATIONS

| | | | |
|---|---|---|---|
| 1,275,002 | 9/1961 | France | 296/76 |

*Primary Examiner*—Benjamin Hersh
*Assistant Examiner*—Milton L. Smith
*Attorney*—W. E. Finken and D. L. Ellis

[57] ABSTRACT

An improved hood-type closure installation for vehicles including a closure supported on the vehicle body by a pair of hinge assemblies for movement between open and closed positions relative to an opening in the vehicle body, each hinge assembly including an intermediate support pivotally mounted on the vehicle body for movement between extended and retracted positions. The intermediate supports carry pintles to support the closure for the aforementioned movement between the open and closed positions and are normally maintained by frangible locking means in the extended positions. Forced rearward bodily shiftable movement of the closure generally in the plane thereof initiates fracture of the frangible locking means after which each intermediate support pivots from the extended to a retracted position and simultaneously forcibly constrains the rear edge of the closure to move in a path of motion toward a position below the corresponding edge of the vehicle body opening.

3 Claims, 4 Drawing Figures

INVENTORS
Edmond R. Gionet &
BY Neil A. Hull

D. L. Ellis
ATTORNEY

INVENTORS
Edmond R. Gionet &
BY Neil A. Hull

D. L. Ellis
ATTORNEY

CLOSURE INSTALLATION

This invention relates generally to vehicle body closure installations and in particular to improved means for mounting a closure on a vehicle body.

The primary feature of this invention is that it provides an improved closure installation for a vehicle body having an access opening therein, the closure installation including a closure adapted to close the vehicle body opening and means for positively constraining an edge of the closure to move toward a position below a corresponding edge of the vehicle body opening upon forced bodily shiftable movement of the closure generally in the plane thereof as might occur in a collision. Another feature of this invention resides in the provision in the closure installation of a hinge assembly including an intermediate support between the vehicle body and the closure which support, in an extended position, supports the closure for normal operation and which, in a retracted position, positively locates a marginal edge of the closure below a corresponding marginal edge of the vehicle body opening. A still further feature of this invention resides in the provision of frangible locking means for normally rigidly maintaining the intermediate support in the extended position, the locking means being breakable or frangible in response to forced bodily shiftable movement of the closure generally in the plane thereof and the intermediate support thereafter moving from the extended to the retracted position and simultaneously constraining an edge of the closure to move in a path of motion toward the aforementioned position below the corresponding edge of the vehicle body opening.

and other features of the invention will be readily apparent from the following specification and from the drawings wherein.

Figure 1:
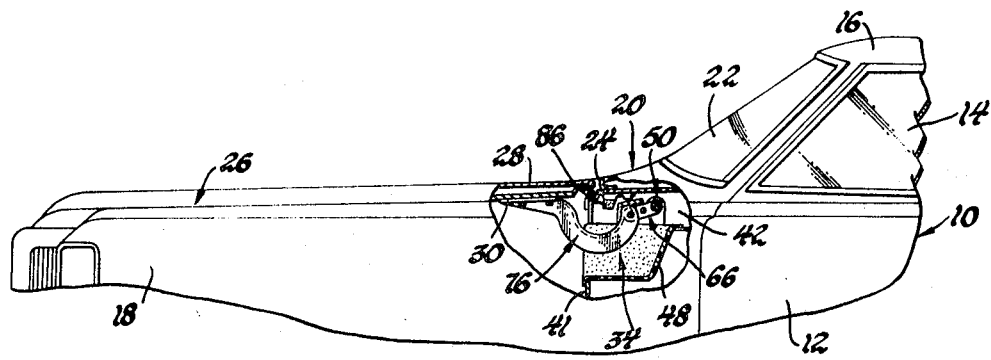
FIG. 1 is a fragmentary partially broken away side elevational view of an automobile-type vehicle body including a closure installation according to this invention.

Referring now to FIG. 1 of the drawings, an automobile-type vehicle body generally designated 10 includes a left front door structure 12 having a window panel 14 movably mounted thereon, a roof structure 16 and a left front fender structure 18. A cowl structure generally designated 20 extends transversely of the vehicle body and sealingly supports the lower edge of a front windshield 22. The cowl structure 20 defines a rear marginal edge 24 of a generally rectangular horizontal opening in the vehicle body providing access to a conventional engine compartment located between the front fender structures. The rectangular engine compartment opening in the vehicle body is adapted to be selectively concealed or closed by a closure installation according to this invention, including a closure or hood structure 26 having an outer panel 28 and an inner panel 30 hem flanged together along a rear marginal edge 32. The closure installation further includes a hinge assembly generally designated 34 operable to normally support the closure or hood on the vehicle body for movement between a closed position, shown in FIG. 1 and in solid lines in FIG. 2, generally concealing the engine compartment opening in coplanar relationship with the cowl structure and an open position, shown in broken lines in FIG. 2, exposing the engine compartment opening. It is to be understood that in the embodiment shown the hinge assembly 34 generally supports the left side of the closure 26 and that an identical hinge assembly is provided to support the right side of the closure and, further, that the following structural and operational description of the left hinge assembly is applicable to the right hinge assembly.

Figure 2:
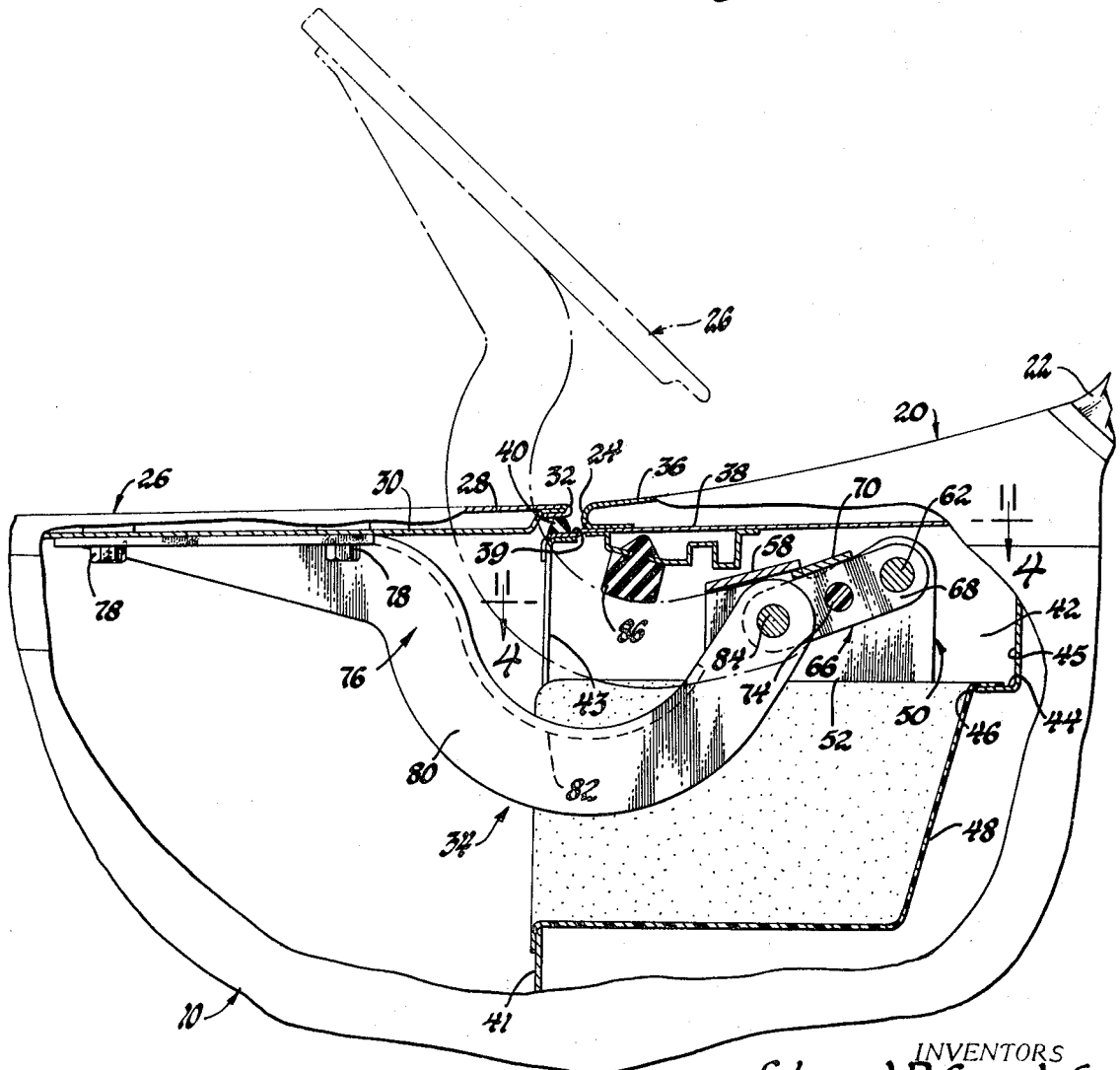
FIG. 2 is an enlarged view of a portion of FIG. 1 and showing the closure in closed and open positions, respectively, in solid and broken lines.
Figure 4:
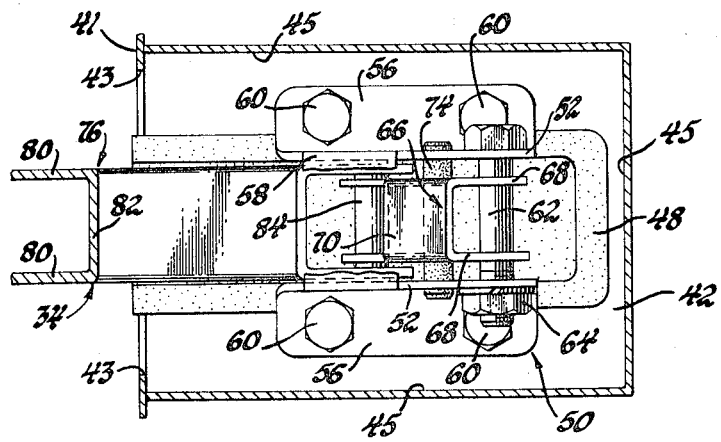
FIG. 4 is a sectional view taken generally along the plane indicated by lines 4—4 in FIG. 2.

Referring particularly now to FIGS. 2 and 4 of the drawings, the vehicle cowl structure includes an outer panel 36, an inner panel 38 defining a lip supporting a seal 40, and a generally vertical end panel 41 defining the rear wall of the engine compartment. A generally rectangular aperture 43 in the end panel 41 opens into a mounting cavity 42 defined by vertical sides 45 and a reinforced lower surface 44. The reinforced lower surface includes a forwardly opening rectangular aperture 46 which is filled by a cup-shaped plastic liner 48 which also opens forwardly and which functions to prevent passage of foreign matter through the mounting cavity to the space behind the cowl structure.

As best seen in FIGS. 2 and 4, the hinge assembly 34 is housed generally within the mounting cavity 42 and includes a bracket member 50 which straddles the aperture 46 and the plastic liner 48 within the mounting cavity 42. The bracket member 50 includes a pair of spaced generally vertical sides 52 each having an outwardly extending horizontal flange 56. A forwardly slanting web 58 integral with each side 52 interconnects the latter so as to impart to the bracket member 50 a rigid, inverted U-shape. A plurality of bolts 60 rigidly fasten the flanges 56 of the bracket member 50 to the lower surface 44 of the mounting cavity, the bracket member being generally centered over plastic liner 48, FIG. 4.

Figure 3:
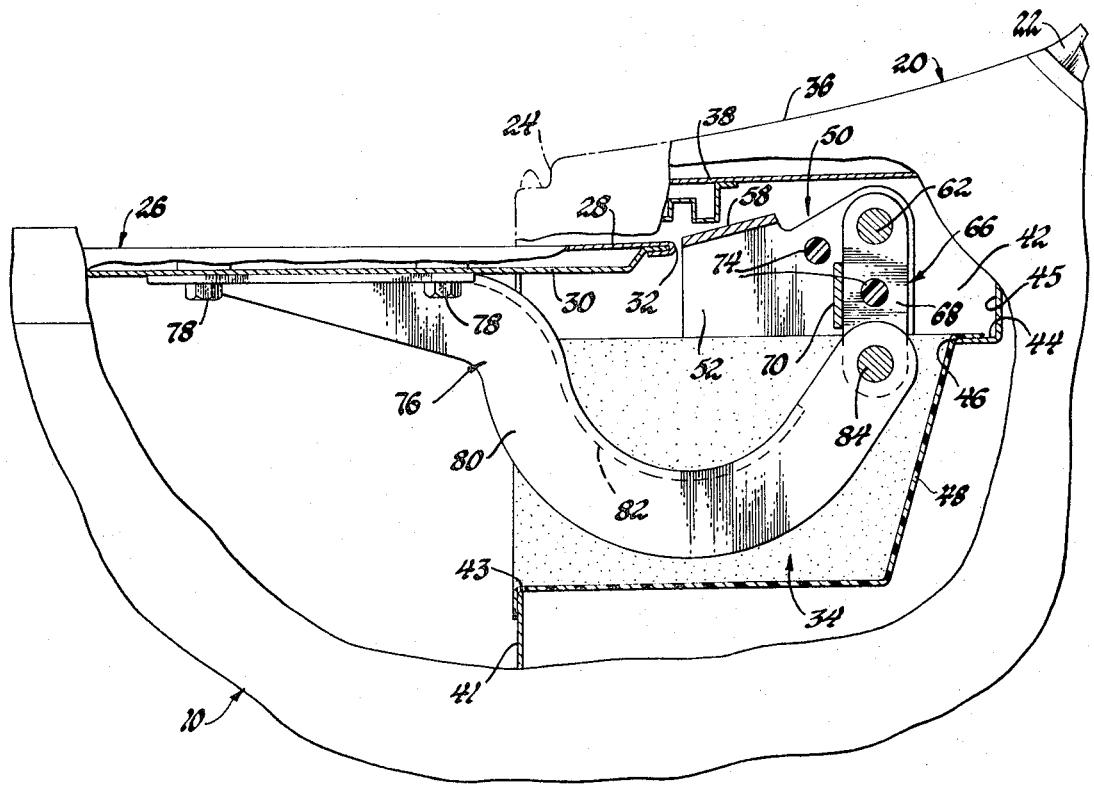
FIG. 3 is similar to FIG. 2 but showing the intermediate support in the retracted position thereof.

Referring again particularly to FIGS. 2 and 4, a bolt 62 extends between respective ones of a pair of axially aligned apertures in sides 52 of the bracket member 50 and is retained on the latter by a nut and lock-washer assembly 64. A rigid and generally U-shaped intermediate support 66 having sides 68 and an integral interconnecting web 70 is supported on bolt 62 for rotation about an axis of the vehicle body defined by the bolt between a generally downwardly slanting extended position, FIG. 2, and a vertical retracted position, FIG. 3, rotated counterclockwise from the extended position. Respective ones of a pair of axially aligned apertures in sides 52 of the bracket member 50 register, in the extended position of the intermediate support 66, with respective ones of a pair of apertures in the sides 68 of the latter and a frangible pin locking means 74 extends through the registered apertures to thereby normally rigidly maintain the support member 66 in the extended position thereof.

As best seen now in FIG. 2, the hinge assembly 34 further includes a gooseneck-type hinge 76 rigidly secured to hood inner panel 30 by a plurality of bolts 78. The gooseneck hinge 76 has a generally U-shaped cross section and includes a pair of sides 80 interconnected by a web 82. Respective ones of a pair of axially aligned apertures in the distal ends of sides 80 of the gooseneck hinge rotatably receive the shank of a pivot shaft 84 which is supported by the intermediate support outboard, FIG. 2, of the frangible pin 74. The intermediate support in the extended position thereof and through the shaft 84 and gooseneck hinge 76, supports the closure 26 on the vehicle body for rotation about an axis defined by the shaft 84 on the intermediate support between the closed and the open positions, shown respectively in solid and broken lines in FIG. 2. A rubber bumper structure 86 extending across mounting cavity 42 is fixedly secured to the underside of cowl structure inner panel 38 and functions to limit opening pivotal movement of the gooseneck hinge 76 and closure 26. In the event that bumper structure 86 becomes inoperative the under side of interconnecting web 58 functions to limit the opening movement of the gooseneck hinge in an equivalent manner. For practical purposes, counterbalance means, not shown, might be provided on the vehicle body to aid in manually moving the closure 26 from the closed to the open position and to maintain the closure in the open position. It will be apparent to those skilled in the art that such a counterbalance arrangement might include a pair of conventional torsion rods each associated with a respective one of the right and left hinge assemblies and anchored at one end to the vehicle body and at the other to the corresponding gooseneck hinge so as to bias the latter toward a position corresponding to the open position of the closure.

The frangible pin 74 embodies, under normal vehicle operating conditions, sufficient strength to maintain the intermediate support 66 in the extended position thereof so that movement of the closure 26 between the closed and open positions proceeds in a conventional manner. When an abnormal occurrence, such as a collision, gives rise to forces tending to bodily shift the closed closure rearwardly, the intermediate support functions to prevent forced camming of the rear edge 32 of the closure over the rear marginal edge 24 of the access opening and onto the cowl structure. Referring more particularly to FIG. 2, the above mentioned forces, normally generally horizontal and rearward in direction, generate a counterclockwise force couple on the intermediate support about bolt 62 due to the forwardly slanting attitude of the intermediate support. The force couple is resisted by the frangible pin until the magnitude of the former exceeds a value predetermined by the strength of the latter at which instant the pin fractures. Subsequent to fracture, of course, there is no significant resistance to the force couple which then proceeds to forcibly rotate the intermediate support counterclockwise from the extended position, FIG. 2, to the retracted position, FIG. 3. Simultaneously, the intermediate support forcibly constrains the gooseneck hinge and, consequently, the rear marginal edge of the closure to follow a path of motion toward a location below the rear marginal edge 24 of the access opening thereby preventing the rear edge 32 of the closure from being cammed up and over the cowl structure toward the windshield.

Having thus described the invention, what is claimed is:

1. In a vehicle body closure installation including a closure adapted to conceal an opening in said vehicle body in a closed position thereof and to reveal said opening in an open position thereof, and hinge means on said closure adapted for mounting of said closure for movement between said positions thereof, the improvement comprising, intermediate support means, means mounting said intermediate support means on said vehicle body adjacent a marginal edge of said opening therein for movement between extended and retracted positions, means mounting said hinge means on said intermediate support means for movement relative thereto, said intermediate support means in said extended position thereof supporting said closure on said vehicle body for movement between said open and said closed positions and being operative in said extended position to locate a corresponding marginal edge of said closure adjacent said marginal edge of said vehicle body opening in generally flush alignment therewith, said intermediate support means in said retracted position thereof being operative to locate said corresponding marginal edge of said closure below said marginal edge of said vehicle body opening, and positioning means for said intermediate support means, said positioning means including means operable to normally maintain said intermediate support means in said extended position thereof, said positioning means being responsive to forced bodily shiftable movement of said closure generally in the plane thereof to move said intermediate support means from said extended to said retracted position thereof thereby to move said corresponding marginal edge of said closure below said marginal edge of said vehicle body opening.

2. In a vehicle body closure installation including a closure adapted to conceal an opening in said vehicle body in a closed position thereof and to reveal said opening in an open position thereof, and hinge means on said closure adapted for mounting of said closure for movement between said positions thereof, the improvement comprising, an intermediate support, means mounting said intermediate support on said vehicle body adjacent a marginal edge of said opening therein for pivotal movement between extended and retracted positions, means mounting said hinge means on said intermediate support for pivotal movement relative thereto, said intermediate support in said extended position thereof supporting said closure on said vehicle body for pivotal movement between said open and said closed positions and being operative in said extended position to locate a corresponding marginal edge of said closure adjacent said marginal edge of said vehicle body opening in generally flush alignment therewith, said intermediate support in said retracted position thereof being operative to locate said corresponding marginal edge of said closure below said marginal edge of said vehicle body opening, and positioning means for said intermediate support, said positioning means including means operable to normally maintain said intermediate support in said extended position thereof, said positioning means being responsive to forced bodily shiftable movement of said closure generally in the plane thereof to move said intermediate support from said extended to said retracted position thereby to move said corresponding marginal edge of said closure below said marginal edge of said vehicle body opening.

3. In a vehicle body closure installation including a closure adapted to conceal a front engine compartment access opening in said vehicle body in a closed position thereof and to reveal said opening in an open position thereof, and hinge means on said closure adapted for mounting of said closure for movement between said positions thereof, the improvement comprising, a bracket member, means rigidly mounting said bracket member on said vehicle body generally adjacent the rear marginal edge of said vehicle body opening, an intermediate support, means mounting said intermediate support on said bracket member for pivotal movement between extended and retracted positions, means mounting said hinge means on said intermediate support for pivotal movement relative thereto, said intermediate support in said extended position thereof supporting said closure on said vehicle body for pivotal movement between said open and said closed positions and being operative in said extended position to locate a corresponding marginal edge of said closure adjacent said rear marginal edge of said opening in generally flush alignment therewith, said intermediate support means in said retracted position thereof being operative to locate said corresponding marginal edge of said closure below said rear marginal edge of said vehicle body opening, and positioning means for said intermediate support, said positioning means including a frangible pin normally rigidly connecting said intermediate support and said bracket member thereby to normally rigidly maintain said intermediate support in said extended position thereof, said positioning means being responsive to forced rearward bodily shiftable movement of said closure generally in the plane thereof to initiate fracture of said frangible pin and movement of said intermediate support from said extended to said retracted position thereof thereby moving said corresponding marginal edge of said closure below said rear marginal edge of said vehicle body opening.

* * * * *